US009563388B2

United States Patent
Bockus et al.

(10) Patent No.: US 9,563,388 B2
(45) Date of Patent: Feb. 7, 2017

(54) SHARING A HOSTED DEVICE IN A COMPUTER NETWORK

(75) Inventors: Michael A. Bockus, Oklahoma City, OK (US); Derek R. Brewer, Bowling Green, OH (US); Jeffrey O. Manthei, Redwood Falls, MN (US); Robert D. Wilhelm, Cheyenne, WY (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 13/085,002

(22) Filed: Apr. 12, 2011

(65) Prior Publication Data

US 2012/0265860 A1    Oct. 18, 2012

(51) Int. Cl.
*G06F 3/12* (2006.01)
*H04L 12/24* (2006.01)
*H04L 12/40* (2006.01)
*H04L 29/12* (2006.01)
*H04L 29/08* (2006.01)
*H04L 29/14* (2006.01)

(52) U.S. Cl.
CPC .......... *G06F 3/1231* (2013.01); *G06F 3/1289* (2013.01); *G06F 3/1291* (2013.01); *H04L 12/40039* (2013.01); *H04L 29/1232* (2013.01); *H04L 29/12254* (2013.01); *H04L 29/12339* (2013.01); *H04L 41/0809* (2013.01); *H04L 61/103* (2013.01); *H04L 67/1002* (2013.01); *H04L 69/40* (2013.01)

(58) Field of Classification Search
CPC .... G06F 3/1231; G06F 3/1289; G06F 3/1291; H04L 41/0809; H04L 29/12339; H04L 12/1232; H04L 12/12254; H04L 12/40039
USPC ................................ 709/220–222, 242, 245
See application file for complete search history.

(56) References Cited

U.S. PATENT DOCUMENTS

| | | | |
|---|---|---|---|
| 8,478,849 B2 * | 7/2013 | Marl et al. ..................... 709/223 |
| 8,543,665 B2 * | 9/2013 | Ansari et al. ................. 709/218 |
| 2003/0149898 A1 * | 8/2003 | Onoda .............. H04L 29/12009 709/228 |
| 2007/0011362 A1 * | 1/2007 | Umekage et al. ............... 710/15 |
| 2008/0052384 A1 * | 2/2008 | Marl et al. ..................... 709/223 |
| 2008/0263126 A1 * | 10/2008 | Soman .............. G06F 17/30887 709/201 |
| 2011/0022694 A1 * | 1/2011 | Dalal et al. .................... 709/222 |
| 2011/0299110 A1 * | 12/2011 | Jazayeri et al. ............. 358/1.15 |
| 2012/0057193 A1 * | 3/2012 | Jazayeri et al. ............. 358/1.15 |
| 2012/0084365 A1 * | 4/2012 | McCann, Jr. ................. 709/206 |
| 2012/0265860 A1 * | 10/2012 | Bockus et al. ................ 709/220 |

* cited by examiner

*Primary Examiner* — Gregory Todd
(74) *Attorney, Agent, or Firm* — Jay Wahlquist (57) ABSTRACT

Sharing a hosted device in a computer network that includes at least one hosted device and a plurality of hosts, including: registering a hosted device with a router, wherein the hosted device is hosted by a host; assigning, by the router, a network-wide identifier to the hosted device; and mapping, by the router, the network-wide identifier for the hosted device to an identifier for the host.

19 Claims, 3 Drawing Sheets

SHARING A HOSTED DEVICE IN A COMPUTER NETWORK

BACKGROUND OF THE INVENTION

Field of the Invention

The field of the invention is data processing, or, more specifically, methods, apparatus, and products for sharing a hosted device in a computer network.

Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In modern computing systems, computing devices are connected to each other via computer networks. Computing devices in such computer networks are frequently coupled to special purpose peripheral devices such as printers, scanners, and so on. Because the computing devices that host these special purpose peripheral devices are connected to other computing devices in a computer network, it is beneficial to share the special purpose peripheral devices amongst the computing devices in the computer network.

Sharing these special purpose peripheral devices amongst the computing devices in the computer network is typically carried out by mapping, in one computing device, a path (e.g., //computing device/peripheral) to a special purpose peripheral device that includes an identifier of the computing device that hosts the special purpose peripheral device. In the event that the computing device that hosts the special purpose peripheral device fails, the special purpose peripheral device may be moved and hosted by another computing device in the computer network. Moving the special purpose peripheral device, however, has the unfortunate consequence of necessitating that all other computing devices in the computer network re-map a new path to the special purpose peripheral device—a new path (e.g., //new computing device/peripheral) that includes an identifier of the computing device that now hosts the special purpose peripheral device.

SUMMARY OF THE INVENTION

Methods, apparatus, and products for sharing a hosted device in a computer network that includes at least one hosted device and a plurality of hosts, including: registering a hosted device with a router, wherein the hosted device is hosted by a host; assigning, by the router, a network-wide identifier to the hosted device; and mapping, by the router, the network-wide identifier for the hosted device to an identifier for the host.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
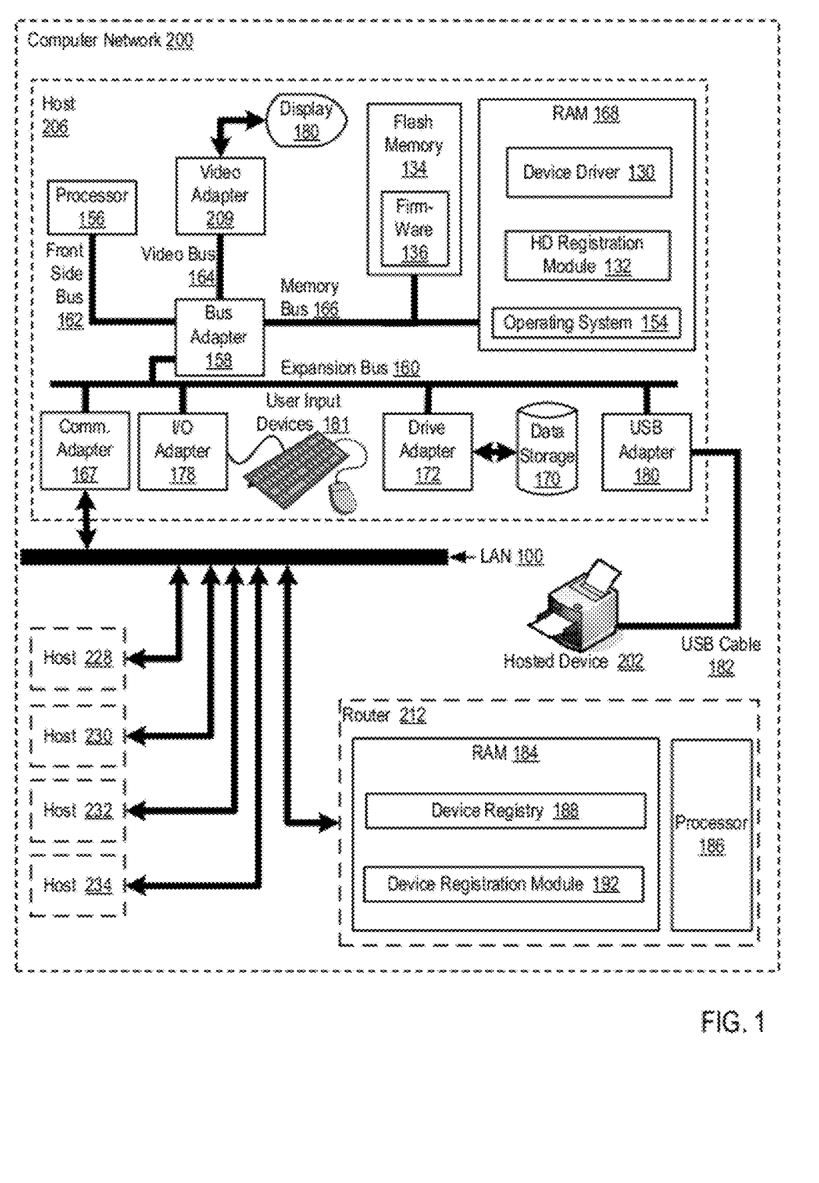
FIG. 1 sets forth a block diagram of automated computing machinery useful in sharing a hosted device in a computer network according to embodiments of the present invention.

Example methods, apparatus, and products for sharing a hosted device in a computer network in accordance with the present invention are described with reference to the accompanying drawings, beginning with FIG. 1. FIG. 1 sets forth a block diagram of automated computing machinery useful in sharing a hosted device (202) in a computer network (200) according to embodiments of the present invention. The example of FIG. 1 includes a computer network (200). The computer network (200) represents a collection of computing devices capable of data communications with each other. The computer network (200) of FIG. 1 includes at least one hosted device (202) and a plurality of hosts (206, 228, 230, 232, 234).

In the example of FIG. 1, the hosted device (202) is any computing device capable of being shared by multiple users of the computer network (200). The hosted device (202) may be embodied, for example, as a shared printer, a shared computer storage device, a shared scanner, or other peripheral device that can be shared, and so on.

In the example of FIG. 1, each host (206, 228, 230, 232, 234) is a computing device connected to the computer network (200) that provides access to services and resources to other devices attached to the computer network (200). In the example of FIG. 1, each host (206, 228, 230, 232, 234) is capable of providing connectivity to the hosted device (202). Examples of such hosts (206, 228, 230, 232, 234) include computing devices that connect to and share a network printer, computing devices that connect to and share an external hard drive, computing devices that connect to and share a scanner, and so on.

In the example of FIG. 1, one host (206) is shown is greater detail than the remaining hosts (228, 230, 232, 234). The host (206) of FIG. 1 includes at least one computer processor (156) or 'CPU' as well as random access memory (168) ('RAM') which is connected through a high speed memory bus (166) and bus adapter (158) to processor (156) and to other components of the host (206). Stored in RAM (168) is a device driver (130), a module of computer program instructions for enabling the host (206), and the computer program applications contained therein, to interact with a hardware device such as the hosted device (202). In the example of FIG. 1, the hosted device (202) is embodied as a printer connected to the host (206) via a Universal Serial Bus ('USB') cable (182) that connects to a USB adapter (180) via a USB port. The hosted device (202) may be alternatively embodied as a scanner, external hard drive, other peripheral device, and so on. The hosted device (202)

may also be coupled to the host (206) via a serial port, parallel port, Wireless USB interface, Serial ATA ('SATA') interface, and so on.

Also stored RAM (168) is a hosted device registration module (132), a module of computer program instructions for registering the hosted device (202) with a router (212) in the computer network (202). Also stored in RAM (168) is an operating system (154). Operating systems useful for sharing a hosted device (202) in a computer network (200) according to embodiments of the present invention include UNIX™ Linux™ Microsoft XP™ AIX™ IBM's i5/OS™, and others as will occur to those of skill in the art. The operating system (154), device driver (130), and hosted device registration module (132) in the example of FIG. 1 are shown in RAM (168), but many components of such software typically are stored in non-volatile memory also, such as, for example, on a disk drive (170).

The host (206) of FIG. 1 includes disk drive adapter (172) coupled through expansion bus (160) and bus adapter (158) to processor (156) and other components of the host (206). Disk drive adapter (172) connects non-volatile data storage to the host (206) in the form of disk drive (170). Disk drive adapters useful in computers for sharing a hosted device in a computer network according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example host (206) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example host (206) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example host (206) of FIG. 1 includes a communications adapter (167) for data communications with other computers and for data communications with a data communications network (100). Such data communications may be carried out serially through RS-232 connections, through external buses such as a USB, through data communications networks such as IP data communications networks, and in other ways as will occur to those of skill in the art. Communications adapters implement the hardware level of data communications through which one computer sends data communications to another computer, directly or through a data communications network. Examples of communications adapters useful for sharing a hosted device in a computer network according to embodiments of the present invention include modems for wired dial-up communications, Ethernet (IEEE 802.3) adapters for wired data communications network communications, and 802.11 adapters for wireless data communications network communications.

The example computer network (200) of FIG. 1 also includes a router (212). In the example of FIG. 1, the router (212) is automated computing machinery for forwarding network traffic among computing devices in the computer network (200). In the example of FIG. 1, the router includes RAM (184) and a processor (186). In alternative embodiments, however, the router may include some other form of computer memory and some other form of computational circuitry.

Stored within RAM (184) of the router (212) is a device registry (188). In the example of FIG. 1, the device registry (188) is a special purpose data structure for storing information related to a hosted device (202) that is hosted by a host (206, 228, 230, 232, 234) that is part of the same computer network (200) as the router (212). The device registry (188) may include, for example, an identifier for a hosted device (202), an identifier for the host (206) that hosts the hosted device (202), a device type for the hosted device (202), and so on.

Also stored within RAM (184) of the router (212) is a device registration module (192), a module of computer program instructions for registering the hosted device (202) with a router (212), assigning, by the router (212), a network-wide identifier to the hosted device (202), and mapping, by the router (212), the network-wide identifier for the hosted device (202) to an identifier for the host (206), for example, in the device registry (188).

Figure 2:
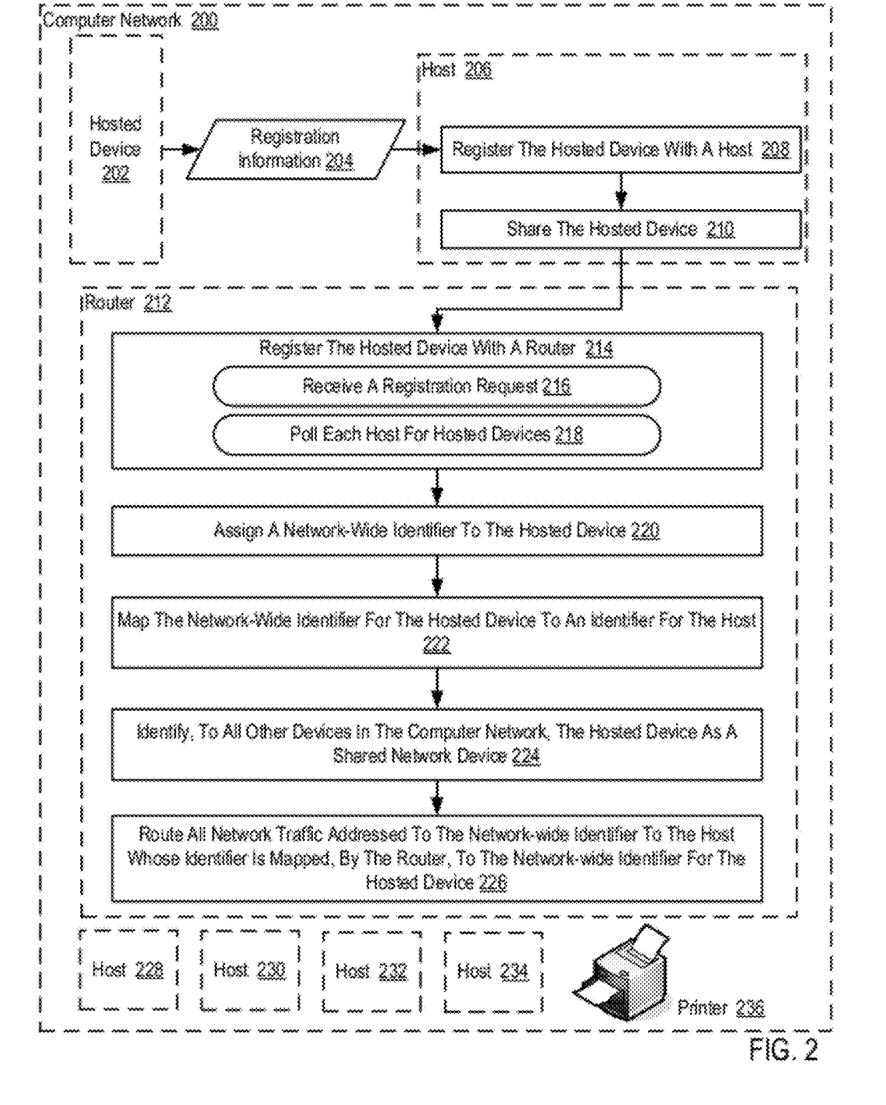
FIG. 2 sets forth a flow chart illustrating an example method for sharing a hosted device in a computer network according to embodiments of the present invention.

For further explanation, FIG. 2 sets forth a flow chart illustrating an example method for sharing a hosted device (202) in a computer network (200) according to embodiments of the present invention. In the example of FIG. 2, the hosted device (202) is any computing device capable of being shared by multiple users of the computer network (200). The hosted device (202) may be embodied, for example, as a shared printer (236), shared computer memory, a shared scanner, or other peripheral device that can be shared, and so on.

In the example of FIG. 2, the computer network (200) includes at least one hosted device (202) and a plurality of hosts (206, 228, 230, 232, 234). Each host (206, 228, 230, 232, 234) in the example of FIG. 2 is a computing device connected to the computer network (200) that provides access to services and resources to other devices attached to the computer network (200). In the example of FIG. 2, each host (206, 228, 230, 232, 234) is capable of providing connectivity to the hosted device (202). Examples of such hosts (206, 228, 230, 232, 234) include computing devices that connect to and share a network printer, computing devices that connect to and share a hard drive, computing devices that connect to and share a scanner, and so on.

The example of FIG. 2 includes registering (208) the hosted device (202) with the host (206). In the example of FIG. 2, registering (208) the hosted device (202) with a host (206) may be carried out, for example, by receiving registration information (204) identifying the hosted device (202) and installing a device driver for the hosted device (202) on the host (206). Such a device driver enables the host (206) to interact with and use the hosted device (202). The device driver also enables the host (206) to communicate with the hosted device (202), for example, via a USB port, serial port, parallel port, Wireless USB interface, SATA interface, and so on.

The example of FIG. 2 also includes sharing (210), by the host (206), the hosted device (202). In the example of FIG. 2, the host (206) can share (210) the hosted device (202) by designating the hosted device (202) as a network device that may be accessed by other devices in the computer network (200) when the hosted device (202) is installed on the host (206). In such an example, the hosted device (202) may therefore be accessible by other devices in the computer network (200).

The example of FIG. 2 also includes registering (214) the hosted device (202) with a router (212). In the example of FIG. 2, registering (214) the hosted device (202) with a router (212) may be carried out, for example, by sending a special purpose message to the router that includes an identifier for the hosted device (202), such as a Media Access Control ('MAC') address, an identification of the host (206) that hosts the hosted device (202), an identification of the device type (e.g., printer, scanner, computer memory) of the hosted device (202), and other information useful in identifying the hosted device (202). In such an example, the router (212) can register (214) the hosted device by storing the information useful in identifying the hosted device (202) in a special purpose device registry stored in computer memory of the router (212). The special purpose device registry may be embodied, for example, as a table, linked list, or other data structure as will occur to those of skill in the art.

In the example of FIG. 2, registering (214) the hosted device (202) with the router (212) may be initiated by the hosted device (202), by the host (206), or by the router (212). Registering (214) the hosted device (202) with the router (212) may therefore be carried out by receiving (216), by the router (212), a registration request. Such a registration request may be sent from the hosted device (202) to the router (212), or from the host (206) to the router (212), via a registration module installed on the host (206). Such a registration module may be embodied as special purpose computer program instructions installed on the host (206) that, upon detection of a hosted device (202), sends information identifying the hosted device (202) to the router (212).

In the example of FIG. 2, registering (214) the hosted device (202) with the router (212) may alternatively be carried out by the router (212) polling (218) each host (206, 228, 230, 232, 234) for a list of hosted devices. The router (212) of FIG. 2 may include a polling module that operates to send a request to each host (206, 228, 230, 232, 234) requesting that each host (206, 228, 230, 232, 234) identify each hosted device hosted by each host (206, 228, 230, 232, 234). In such an example, the router (212) may poll (218) each host (206, 228, 230, 232, 234) at predetermined intervals, upon user request, and so on.

The example of FIG. 2 also includes assigning (220), by the router (212), a network-wide identifier to the hosted device (202). In the example of FIG. 2, the network-wide identifier may be embodied, for example, as an IP address, as the MAC address of the hosted device (202), or other unique identifier. In such an example, the network-wide identifier may therefore be used by other devices in the computer network (200) to access the hosted device (202). That is, other devices in the computer network (200) can simply map the hosted device (202) to its network-wide identifier rather than mapping the hosted device (202) to a host-specific path such as //host/hosted device.

The example of FIG. 2 also includes mapping (222), by the router (212), the network-wide identifier for the hosted device (202) to an identifier for the host (206). In the example of FIG. 2, mapping (222) the network-wide identifier for the hosted device (202) to an identifier for the host (206) may be carried out through the use of a device registry stored in the computer memory of the router (212) that includes information identifying the hosted device (202). For example, a device registry may be embodied as a table as follows:

TABLE 1

Device Registry Table

| Network-Wide ID | Host IP Address | HD MAC Address | HD Type |
|---|---|---|---|
| 122.16.1.34 | 122.16.5.68 | 01:23:45:67:89:ab | 1 |
| 122.16.1.38 | 122.16.5.68 | 18:04:16:43:21:ef | 2 |
| 122.16.6.14 | 122.16.19.47 | 10:89:34:16:41:ae | 1 |
| 122.16.18.58 | 122.16.63.13 | 41:26:38:41:22:bb | 3 |

In the example device registry table depicted in Table 1, the network-wide identifiers for each hosted device are embodied as an IP address, the identifier for each host is also embodied as an IP address of the host, the identifier for each hosted device is embodied as a MAC address of the hosted device, and the device type for each hosted device is identified as an integer value that maps to a particular device type. For example, a value of '1' may indicate that the hosted device is a printer, a value of '2' may indicate that the hosted device is an external hard drive, and a value of '3' may indicate that the hosted device is a scanner.

In the example device registry table depicted in Table 1, each network-wide identifier is unique such that each network-wide identifier identifies one and only one hosted device. Each host identifier, however, is not necessarily unique as each host may host more than one hosted device. For example, in Table 1 the host identified by the IP address of 122.16.5.68 hosts both a printer and an external hard drive. In the example device registry table depicted in Table 1, each hosted device identifier is also unique as the hosted device identifier identifies one and only one hosted device. In the example device registry table depicted in Table 1, however, each hosted device type identifier is not necessarily unique as there may be multiple instances of the same type of device in a computer network. For example, Table 1 indicates that there are two printers, as identified by a hosted device type identifier of '1', which are each hosted by different hosts.

The example of FIG. 2 also includes identifying (224), by the router (212) to all other devices in the computer network (200), the hosted device (202) as a shared network device. In such an example, the router (212) may broadcast a message to all other devices in the computer network (200) that includes the network-wide identifier for the hosted device (202), the device type of the hosted device (202), and other information identifying the hosted device (202) and its capabilities. Upon receipt of such a message, all other devices in the computer network (200) may be authorized to utilize the hosted device (202) by accessing the hosted device via the router (212) using the network-wide identifier for the hosted device (202).

The example of FIG. 2 also includes routing (226), by the router (212), all network traffic addressed to a particular network-wide identifier to the host (206, 228, 230, 232, 234) whose identifier is mapped, by the router (212), to the network-wide identifier for the hosted device (202). In the example of FIG. 2, this may be carried out, for example, by examining all packets received by the router (212), checking the destination address of each packet, and looking up the destination address in a device registry table to determine whether the destination address matches a network-wide identifier contained in the device registry table. Upon determining that network traffic is addressed to a hosted device identified by a network-wide identifier contained in the device registry table, the router (212) may route the traffic to the host (206, 228, 230, 232, 234) whose identifier is mapped in the device registry table to the network-wide identifier that matches the destination address of the traffic.

Figure 3:
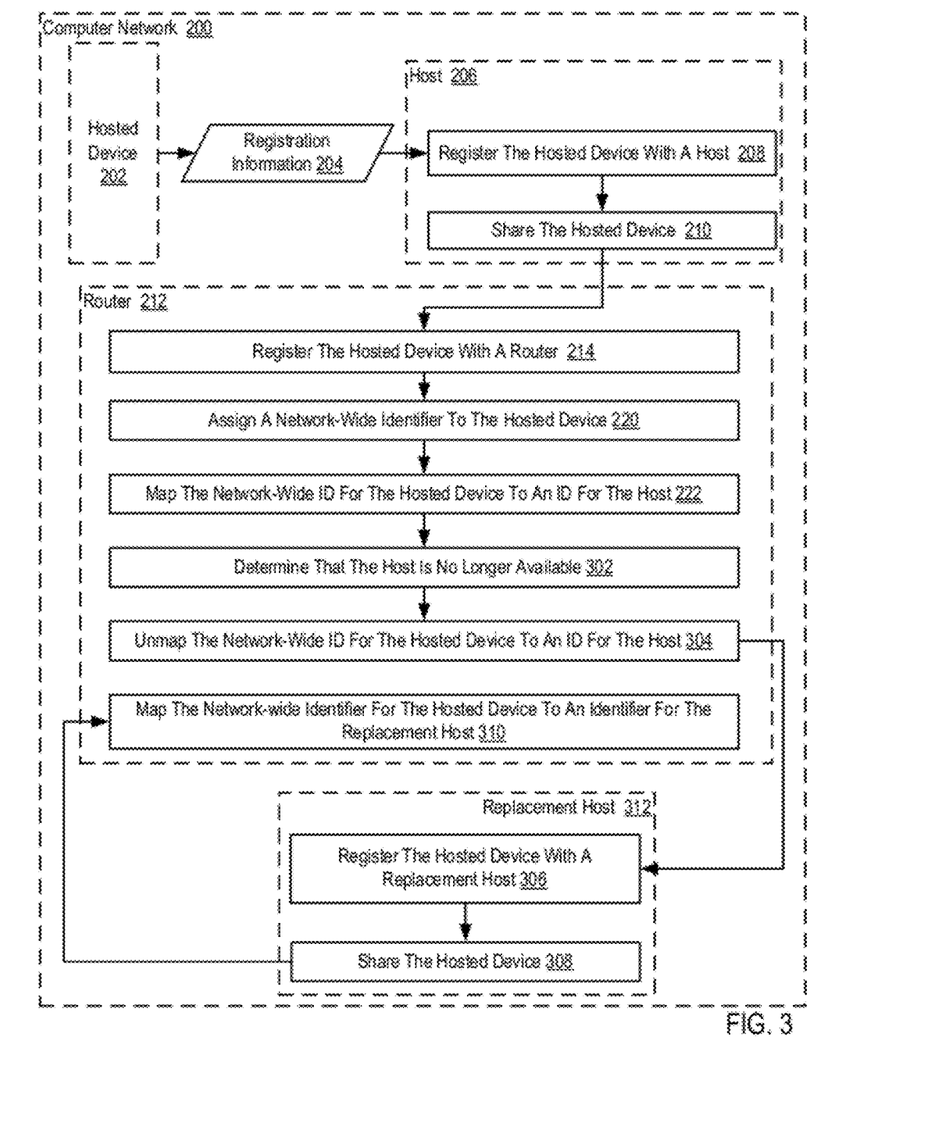
FIG. 3 sets forth a flow chart illustrating an example method for sharing a hosted device in a computer network according to embodiments of the present invention.

For further explanation, FIG. 3 sets forth a flow chart illustrating an example method for sharing a hosted device (202) in a computer network (200) according to embodiments of the present invention. The example of FIG. 3 is similar to the example of FIG. 2 as it also includes registering (208) the hosted device (202) with a host (206); sharing (210), by the host (206), the hosted device (202); registering (214) the hosted device (202) with a router (212); assigning (220), by the router (212), a network-wide identifier to the hosted device (202); and mapping (222), by the router (212), the network-wide identifier for the hosted device (202) to an identifier for the host (206).

The example of FIG. 3, however, also includes determining (302), by the router (212), that the host (206) is no longer available. In the example of FIG. 3, determining (302) that the host (206) is no longer available may be carried out, for example, by pinging the host (206) and failing to receive a response, by receiving a communication failure alert upon directing network traffic to the host (206), by determining that the host (206) is no longer part of the computer network (200), and in other ways as will occur to those of skill in the art. In such an example, the host (206) may be unavailable due to a hardware failure on the host (206), a software failure on the host (206), because the host (206) has been physically disconnected from the computer network (200), and so on.

The example of FIG. 3 also includes, upon determining that the host (206) is no longer available, unmapping (304), by the router (212), the network-wide identifier for the hosted device (202) from an identifier for the host (206). In the example of FIG. 3, unmapping (304), by the router (212), the network-wide identifier for the hosted device (202) from an identifier for the host (206) may be carried out, for example, by removing an entry in a device registry that corresponds to the unavailable host. For example, referring to Table 1 above, consider an example in which the host identified by an IP address of 122.16.19.47 became unavailable. In such an example, unmapping (304) the network-wide identifier for the hosted device (202) from an identifier for the host (206) upon determining that the host (206) is no longer available would result in the following device registry:

TABLE 2

Device Registry Table

| Network-Wide ID | Host IP Address | HD MAC Address | HD Type |
|---|---|---|---|
| 122.16.1.34 | 122.16.5.68 | 01:23:45:67:89:ab | 1 |
| 122.16.1.38 | 122.16.5.68 | 18:04:16:43:21:ef | 2 |
| 122.16.18.58 | 122.16.63.13 | 41:26:38:41:22:bb | 3 |

In Table 2, the entry for the host identified by an IP address of '122.16.19.47' has been removed as the host is no longer available. As such, an entry for the hosted device with a device type of '1', a MAC address of '10:89:34:16:41:ae', and a network-wide identifier of '122.16.6.14' has been removed.

The example of FIG. 3 also includes registering (306) the hosted device (202) with a replacement host (312). In the example of FIG. 3, the replacement host (312) is a computing device capable of providing connectivity to the hosted device (202). Examples of such a replacement host (312) include computing devices that connect to and share a network printer, computing devices that connect to and share a hard drive, computing devices that connect to and share a scanner, and so on.

In the example of FIG. 3, registering (306) the hosted device (202) with a replacement host (312) may be carried out, for example, by receiving registration information (204) identifying the hosted device (202) and installing a device driver for the hosted device (202) on the replacement host (312). Such a device driver enables the replacement host (312) to interact with and use the hosted device (202). Such a device driver further enables the replacement host (312) to communicate with the hosted device (202), for example, via a USB port, serial port, parallel port, Wireless USB interface, SATA interface, and so on.

The example of FIG. 3 also includes sharing (308), by the replacement host (312), the hosted device (202). In the example of FIG. 3, the replacement host (312) can share (308) the hosted device (202) by designating the hosted device (202) as a network device that may be accessed by other devices in the computer network (200) when the hosted device (202) is installed on the replacement host (312).

The example of FIG. 3 also includes mapping (310), by the router (212), the network-wide identifier for the hosted device (202) to an identifier for the replacement host (312). In the example of FIG. 3, mapping (310) the network-wide identifier for the hosted device (202) to an identifier for the replacement host (312) may be carried out through the use of a device registry stored in the computer memory of the router (212) that includes information identifying the hosted device (202). For example, the device registry depicted in Table 2 may be updated by adding an entry into the device registry, such that the updated device registry appears as follows:

TABLE 3

Device Registry Table

| Network-Wide ID | Host IP Address | HD MAC Address | HD Type |
|---|---|---|---|
| 122.16.1.34 | 122.16.5.68 | 01:23:45:67:89:ab | 1 |
| 122.16.1.38 | 122.16.5.68 | 18:04:16:43:21:ef | 2 |
| 122.16.6.14 | 122.16.16.81 | 10:89:34:16:41:ae | 1 |
| 122.16.18.58 | 122.16.63.13 | 41:26:38:41:22:bb | 3 |

In the example described above, the hosted device with a device type of '1', a MAC address of '10:89:34:16:41:ae', and a network-wide identifier of '122.16.6.14' has been added back into the device registry. Because the hosted device has been moved to be hosted by the replacement host (312), however, the host IP address associated with this hosted device is now '122.16.16.81' rather than '122.16.19.47', which was the IP address of the original host (206). The network-wide identifier for the hosted device, however, remains the same as the network-wide identifier that was associated with the hosted device when the hosted device was hosted by the original host. Retaining the same network identifier may be carried out, for example, by maintaining in memory of the router (212) a list of network-wide identifiers that have ever been assigned by the router, and associating these network-wide identifiers with a hosted device identifier, such that if the hosted device identified by the hosted device identifier ever reappears on the network, the host device will be assigned its original network-wide identifier.

Because the hosted device still has the same network-wide identifier of '122.16.6.14', any other devices in the computer network (200) that make use of this hosted device do not need to re-map the hosted device after the hosted device has been moved from the original host (206) to the replacement host (312). That is, because other devices in the computer network (200) that make use of the hosted device (202) address the hosted device (202) using the network-wide identifier, rather than a path than a host dependent path, there is no need for devices in the computer network (200) that make use of the hosted device (202) to re-map the hosted device (202).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of sharing a hosted device in a computer network, the computer network having at least one hosted device and a plurality of hosts, the at least one hosted device physically separate from the plurality of hosts, the method comprising:
   registering, using a hosted-device address of a hosted device physically separate from the plurality of hosts, the hosted device with a router;
   associating, using the router, a network-wide identifier with the hosted-device address of the hosted device physically separate from the plurality of hosts, wherein the network-wide identifier includes a computer network address;
   mapping, using the router, the network-wide identifier to a first network address of a first host that hosts the hosted device physically separate from the plurality of hosts;
   communicating, using the router, the network-wide identifier of the hosted device to one or more devices in the computer network without communicating any identifying information of the first host to the one or more devices such that the one or more devices map the hosted device to the network-wide identifier associated with the hosted-device rather than to a host-specific path associated with the first host;
   routing data packets received at the router from the one or more devices that have the network-wide identifier of the hosted device as a destination address to the first host based on the mapped first network address;
   determining, using the router, the first host is no longer available;
   unmapping, using the router, the network-wide identifier from the first network address in response to determining the first host is no longer available;
   mapping, using the router, the network-wide identifier to a second network address of a second host in response to detecting that the hosted device physically separate from the plurality of hosts is hosted by the second host; and
   after mapping the network-wide identifier to the second network address, routing data packets received at the router from the one or more devices that have the network-wide identifier of the hosted device as a destination address to the second host based on the mapped second network address.

2. The method of claim 1 further comprising using the router to notify other devices in the computer network that the hosted device is a shared network device.

3. The method of claim 1 further comprising routing, using the router, all network traffic addressed to the network-wide identifier to the host whose network address is mapped, using the router, to the network-wide identifier for the hosted device.

4. The method of claim 1 further comprising broadcasting a message, by the router to multiple other devices in the computer network, identifying the hosted device as a shared network device, wherein the message includes:
   the network-wide identifier for the hosted device,
   a device type of the hosted device, and
   information identifying capabilities of the hosted device.

5. The method of claim 1 further comprising authorizing multiple other devices in the computer network to utilize the hosted device by accessing the hosted device via the router using the network-wide identifier for the hosted device.

6. The method of claim 1 further comprising examining packets received by the router; checking a destination address of each packet; looking up the destination address in a device registry table; and determining whether the destination address matches the network-wide identifier contained in the device registry table.

7. The method of claim 1, wherein the computer network address includes a router-assigned-static-device network address for a specific computing device.

8. The method of claim 1, wherein mapping, using the router, the network-wide identifier to a second network address of a second host includes:
   storing, in memory of the router, a set of network-wide identifiers that have been assigned by the router;
   maintaining, by the router, the set of network identifiers that have been assigned by the router;
   correlating a first network-wide identifier of the set of network wide identifiers with a first hosted device identifier of a first host;
   determining the first host is available; and
   mapping the first network-wide identifier to a first network address of the first host that hosts the hosted device.

9. The method of claim 1, wherein the hosted device is a printer.

10. A router for sharing a hosted device in a computer network, the computer network having at least one hosted device and a plurality of hosts, the router comprising a computer processor, a computer memory operatively coupled to the computer processor, the computer memory having disposed within it computer program instructions that, when executed by the processor, cause the router to carry out the steps of:
   registering, using a hosted-device address of a hosted device, the hosted device at a first time, the hosted device being locally connected to a first host of the plurality of hosts at the first time;
   associating a network-wide identifier with the hosted-device address of the hosted device;
   mapping the network-wide identifier to a first network address of a first host that hosts the hosted device;
   communicating the network-wide identifier of the hosted device to one or more devices in the computer network without communicating any identifying information of the first host to the one or more devices such that the one or more devices map the hosted device to the network-wide identifier associated with the hosted-device rather than to a host-specific path associated with the first host;
   routing data packets received at the router from the one or more devices that have the network-wide identifier of the hosted device as a destination address to the first host based on the mapped first network address;
   determining the first host is no longer available;
   unmapping the network-wide identifier from the first network address in response to determining the first host is no longer available;
   mapping the network-wide identifier to a second network address of a second host of the plurality of hosts in response to detecting, at a second time, that the hosted device is locally connected to the second host and is hosted by the second host, wherein the second time is subsequent to the first time; and
   after mapping the network-wide identifier to the second network address, routing data packets received at the router from the one or more devices that have the network-wide identifier of the hosted device as a destination address to the second host based on the mapped second network address.

11. The router of claim 10 wherein the computer memory also has disposed within it computer program instructions that, when executed by the processor, cause the router to carry out the step of routing all network traffic addressed to the network-wide identifier to the host whose network address is mapped to the network-wide identifier for the hosted device.

12. The router of claim 10 wherein the hosted-device address is based on a media access control address, the network-wide identifier is the computer network address which is a first internet protocol address, and the first network address is a second internet protocol address.

13. The router of claim 10 further comprising broadcasting a message, by the router to multiple other devices in the computer network, identifying the hosted device as a shared network device, wherein the message includes:
the network-wide identifier for the hosted device,
a device type of the hosted device, and
information identifying capabilities of the hosted device.

14. The router of claim 10 further comprising authorizing multiple other devices in the computer network to utilize the hosted device by accessing the hosted device via the router using the network-wide identifier for the hosted device.

15. The router of claim 10 further comprising examining packets received by the router; checking a destination address of each packet; looking up the destination address in a device registry table; and determining whether the destination address matches the network-wide identifier contained in the device registry table.

16. The router of claim 10, wherein the computer network address includes a router-assigned-static-device network address for a specific computing device.

17. A method of sharing a hosted device in a computer network, the computer network having at least one hosted device and a plurality of hosts, the at least one hosted device physically separate from the plurality of hosts, the method comprising:
registering, using a hosted-device address of a hosted device physically separate from the plurality of hosts, the hosted device with a router;
associating, using the router, a network-wide identifier with the hosted-device address of the hosted device physically separate from the plurality of hosts, wherein the network-wide identifier is a first internet protocol address;
mapping, using the router, the network-wide identifier to a first network address of a first host that hosts the hosted device physically separate from the plurality of hosts;
communicating, using the router, the network-wide identifier of the hosted device to one or more devices in the computer network without communicating any identifying information of the first host to the one or more devices such that the one or more devices map the hosted device to the network-wide identifier associated with the hosted-device rather than to a host-specific path associated with the first host;
routing data packets received at the router from the one or more devices that have the network-wide identifier of the hosted device as a destination address to the first host based on the mapped first network address.

18. The method of claim 17 wherein the hosted-device address is based on a media access control address, the first network address is a second internet protocol address, and the second network address is a third internet protocol address.

19. The method of claim 17 further comprising:
broadcasting a message, by the router to multiple other devices in the computer network, identifying the hosted device as a shared network device, wherein the message includes:
the network-wide identifier for the hosted device,
a device type of the hosted device, and
information identifying capabilities of the hosted device;
authorizing multiple other devices in the computer network to utilize the hosted device by accessing the hosted device via the router using the network-wide identifier for the hosted device;
examining packets received by the router;
checking a destination address of each packet;
looking up the destination address in a device registry table; and
determining whether the destination address matches the network-wide identifier contained in the device registry table.

* * * * *